(12) United States Patent
Chen et al.

(10) Patent No.: US 10,608,336 B2
(45) Date of Patent: Mar. 31, 2020

(54) ANTENNA DEVICE AND ELECTRONIC DEVICE COMPRISING ANTENNA

(71) Applicant: Samsung Electronics Co., Ltd., Gyeonggi-do (KR)

(72) Inventors: Kuo Cheng Chen, Gyeonggi-do (KR); Se Hyun Park, Gyeonggi-do (KR); Tae Young Kim, Gyeonggi-do (KR); Ahmed Hussain, Gyeonggi-do (KR); Igor Shcherbatko, Gyeonggi-do (KR); Je Hun Jong, Seoul (KR); Jin Woo Jung, Seoul (KR); Jae Hoon Jo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 16/022,023

(22) Filed: Jun. 28, 2018

(65) Prior Publication Data

US 2019/0006751 A1 Jan. 3, 2019

(30) Foreign Application Priority Data

Jun. 28, 2017 (KR) .......................... 10-2017-0081751

(51) Int. Cl.
*H01Q 3/24* (2006.01)
*H01Q 3/36* (2006.01)
(Continued)

(52) U.S. Cl.
CPC ............ *H01Q 3/247* (2013.01); *H01Q 1/243* (2013.01); *H01Q 1/246* (2013.01); *H01Q 1/48* (2013.01);
(Continued)

(58) Field of Classification Search
CPC ...... H01Q 3/247; H01Q 1/243; H01Q 25/001; H01Q 21/28; H01Q 21/24; H01Q 21/062; H01Q 1/48
USPC .................................................. 343/700 MS
See application file for complete search history.

(56) References Cited

U.S. PATENT DOCUMENTS

| | | |
|---|---|---|
| 7,187,328 B2 | 3/2007 | Tanaka et al. |
| 9,093,758 B2 * | 7/2015 | Kish ...................... H01Q 3/242 |

(Continued)

FOREIGN PATENT DOCUMENTS

CN 205911439 1/2017

OTHER PUBLICATIONS

International Search Report dated Oct. 19, 2018 issued in counterpart application No. PCT/KR2018/007353, 5 pages.

(Continued)

*Primary Examiner* — Brian K Young
(74) *Attorney, Agent, or Firm* — The Farrell Law Firm, P.C.

(57) ABSTRACT

An antenna device includes a ground member including a plane part and a plurality of extension parts extending from one end of the plane part in a first direction and arranged along a second direction, a plurality of patch-type radiators arranged on the plane part along the second direction and configured to radiate vertical polarization, and a plurality of straight radiators spaced apart from the ground member, respectively arranged to be adjacent to the plurality of extension parts, extending in the first direction, and configured to radiate horizontal polarization.

21 Claims, 18 Drawing Sheets

(51) Int. Cl.
*H01Q 1/24* (2006.01)
*H01Q 25/02* (2006.01)
*H01Q 21/00* (2006.01)
*H01Q 21/06* (2006.01)
*H04B 7/10* (2017.01)
*H01Q 1/48* (2006.01)
*H01Q 25/00* (2006.01)
*H01Q 21/24* (2006.01)
*H01Q 21/28* (2006.01)

(52) U.S. Cl.
CPC ............ *H01Q 3/36* (2013.01); *H01Q 21/005* (2013.01); *H01Q 21/062* (2013.01); *H01Q 21/065* (2013.01); *H01Q 21/24* (2013.01); *H01Q 21/28* (2013.01); *H01Q 25/001* (2013.01); *H01Q 25/02* (2013.01); *H04B 7/10* (2013.01)

(56) References Cited

U.S. PATENT DOCUMENTS

| | | | |
|---|---|---|---|
| 9,178,558 B2* | 11/2015 | Lea | H01Q 21/24 |
| 9,666,954 B2* | 5/2017 | Ko | H01Q 21/245 |
| 9,716,316 B2* | 7/2017 | Park | H01Q 3/24 |
| 9,819,098 B2 | 11/2017 | Gu et al. | |
| 2006/0139209 A1 | 6/2006 | Tanaka et al. | |
| 2013/0300602 A1 | 11/2013 | Zhou et al. | |
| 2015/0070228 A1 | 3/2015 | Gu et al. | |
| 2016/0087348 A1 | 3/2016 | Ko et al. | |
| 2017/0125910 A1 | 5/2017 | Pance et al. | |

OTHER PUBLICATIONS

Written Opinion dated Oct. 19, 2018 issued in counterpart application No. PCT/KR2018/007353, 6 pages.

\* cited by examiner

ANTENNA DEVICE AND ELECTRONIC DEVICE COMPRISING ANTENNA

CROSS-REFERENCE TO RELATED APPLICATION(S)

This application is based on and claims priority under 35 U.S.C. § 119 to Korean Patent Application No. 10-2017-0081751, filed on Jun. 28, 2017, in the Korean Intellectual Property Office, the disclosure of which is incorporated by reference herein its entirety.

BACKGROUND

1. Field

The present disclosure relates generally to an antenna array in an electronic device and, more particularly, to an antenna array in an electronic device that is capable of reducing a space occupied by the antenna array for horizontal polarization and vertical polarization.

2. Description of Related Art

With the rapid increase in mobile traffic, fifth generation mobile communication (5G) technology based on an extremely high frequency band of 28 GHz or more is being developed. A signal of the extremely high frequency band includes a millimeter wave having a frequency band of 30 GHz to 300 GHz. If the frequency of an extremely high band is used, since the wavelength of the signal is short, the antenna and the device may be smaller and/or lighter. In addition, since a relatively large number of antennas may be mounted on the same area due to the short wavelength, the transmitted signal may be concentrated in a certain direction. Furthermore, since a large amount of bandwidth is available, a large amount of information may be transmitted.

The above information is presented as background information only to assist with an understanding of the present disclosure. No determination has been made, and no assertion is made, as to whether any of the above might be applicable as prior art with regard to the present disclosure.

SUMMARY

For example, an antenna device may include a broad-side antenna array and an end-fire antenna array surrounding at least part of the broad-side antenna array. The end-fire antenna array may include a plurality of radiators for horizontal polarization and a plurality of radiators for vertical polarization. For the purpose of including a plurality of radiators for horizontal polarization and a plurality of radiators for vertical polarization, the end-fire antenna array may occupy more space.

Aspects of the present disclosure are to address at least the above-mentioned problems and/or disadvantages and to provide at least the advantages described below. Accordingly, an aspect of the present disclosure is to provide a structure capable of reducing the space occupied by an antenna array for horizontal polarization and vertical polarization.

In accordance with an aspect of the present disclosure, an electronic device is provided. The electronic device includes a housing including a front plate, a back plate facing away from the front plate, and a side member surrounding a space between the front plate and the back plate, a touchscreen display exposed through the front plate, an antenna array positioned inside the space, and including at least one group of a first conductive plate oriented parallel to the back plate and spaced from the back plate by a first distance, a pair of conductive elements spaced from the first conductive plate when viewed from above the back plate, oriented parallel to the back plate, and including a first conductive element spaced from the back plate by a second distance greater than the first distance and a second conductive element spaced from the back plate by a third distance greater than the second distance and a second conductive plate interposed between the first conductive plate and the pair of conductive elements when viewed from above the back plate and spaced from the back plate by a fourth distance greater than the first distance and less than the second distance, a wireless communication circuit electrically connected to the first conductive element and the first conductive plate, wherein the communication circuit is configured to transmit and/or receive a signal in a range between 20 GHz and 40 GHz, and a processor electrically connected to the touchscreen display and the wireless communication circuit.

In accordance with another aspect of the present disclosure, an antenna device is provided. The antenna device includes a ground member including a plane part and a plurality of extension parts extending from one end of the plane part in a first direction and arranged along a second direction, a plurality of patch-type radiators arranged on the plane part along the second direction and configured to radiate vertical polarization, and a plurality of straight radiators spaced apart from the ground member, respectively arranged to be adjacent to the plurality of extension parts, extending in the first direction, and configured to radiate horizontal polarization.

In accordance with another aspect of the present disclosure, an antenna device is provided. The antenna device includes a broad-side antenna array and an end-fire antenna array disposed adjacent to one end of the broad-side antenna array, wherein the end-fire antenna array includes a ground member including a plane part and a plurality of extension parts extending from one end of the plane part in a first direction being a direction away from the broad-side antenna array and arranged along a second direction perpendicular to the first direction, a plurality of patch-type radiators arranged on the plane part along the second direction and configured to radiate vertical polarization, and a plurality of straight radiators spaced apart from the ground member, respectively arranged to be adjacent to the plurality of extension parts, extending in the first direction, and configured to radiate horizontal polarization.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, embodiments of the present disclosure are described with reference to the accompanying drawings. Accordingly, those of ordinary skill in the art will recognize that a modification, an equivalent, and/or an alternative of the various embodiments described herein may be made without departing from the scope and spirit of the present disclosure, as defined by the appended claims and their equivalents.

Figure 1:
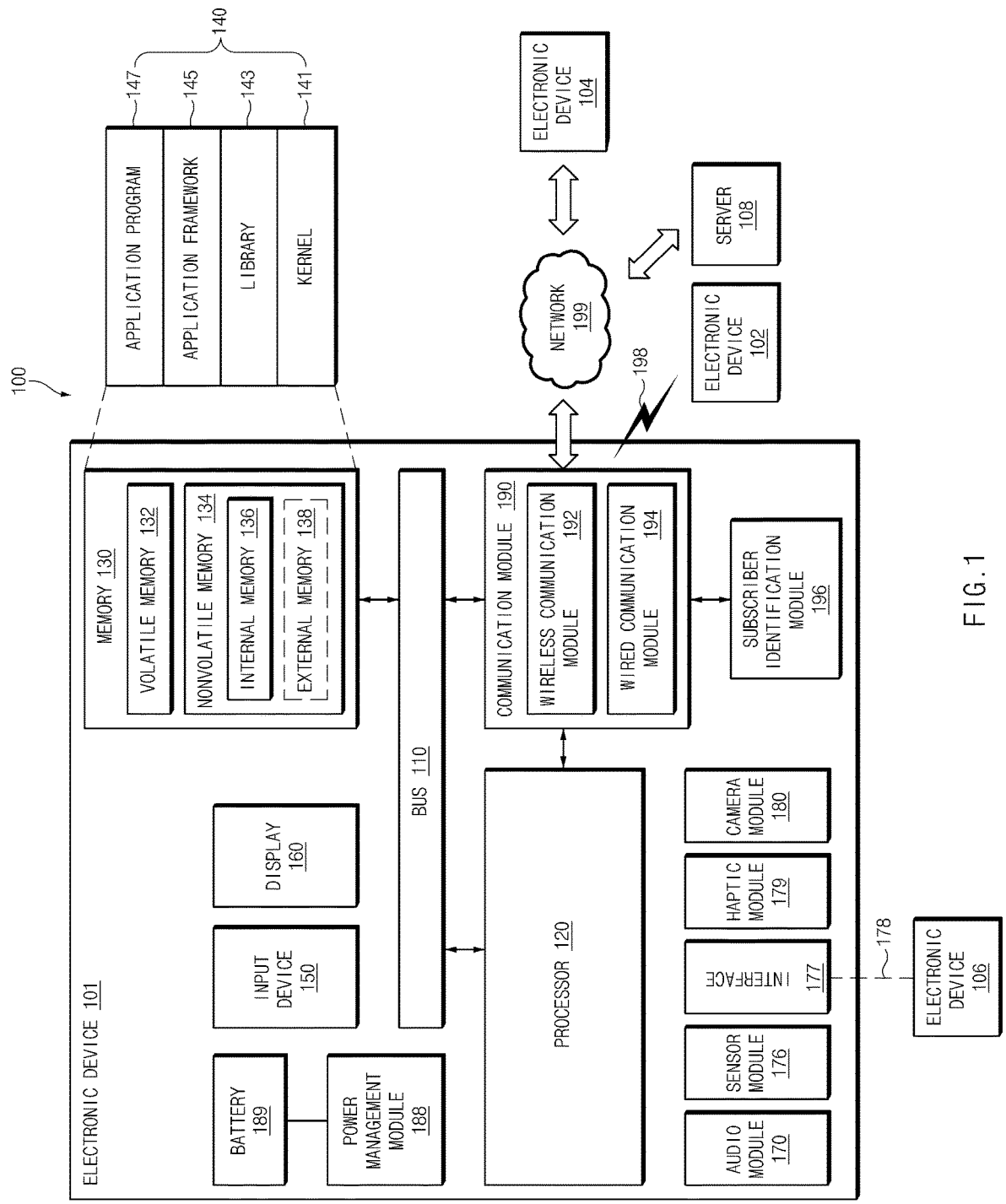
FIG. 1 illustrates a block diagram of an electronic device in a network environment, according to an embodiment.

FIG. 1 illustrates an electronic device 101 in a network environment 100, according to an embodiment. The electronic device 101 may include various types of devices. For example, the electronic device 101 may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an electronic book (e-book) reader or a moving picture experts group audio layer 3 (MP3) player), a portable medical device (e.g., a heart rate measuring device, a blood glucose level measuring device, a blood pressure measuring device, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to an embodiment, the electronic device 101 may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to an embodiment, the electronic device 101 may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or an Internet of things (IoT) device (e.g., a light bulb, a sprinkler, a fire alarm, a thermostat, or a street lamp). The electronic device 101 is not limited to the above-described devices. For example, similarly to a smartphone having a function of measuring personal bio-information (e.g., a heart rate or a blood glucose level), the electronic device 101 may provide functions of multiple devices in a complex manner. In the present disclosure, the term "user" may refer to a person who uses the electronic device 101 or may refer to a device (e.g., an artificial intelligence electronic device) that uses the electronic device 101.

Referring to FIG. 1, under the network environment 100, the electronic device 101 (e.g., an electronic device) may communicate with an electronic device 102 through local wireless communication 198 or may communication with an electronic device 104 or a server 108 through a network 199. According to an embodiment, the electronic device 101 may communicate with the electronic device 104 through the server 108.

According to an embodiment, the electronic device 101 may include a bus 110, a processor 120 (e.g., a processor), a memory 130, an input device 150 (e.g., a microphone or a mouse), a display 160, an audio module 170, a sensor module 176, an interface 177, a haptic module 179, a camera module 180, a power management module 188, a battery 189, a communication module 190, and a subscriber identification module 196. The electronic device 101 may omit at least one (e.g., the display 160 or the camera module 180) of the above-described elements or may further include other element(s).

For example, the bus 110 may interconnect the above-described elements 120 to 190 and may include a circuit for conveying signals (e.g., a control message or data) between the above-described elements.

The processor 120 may include one or more of a central processing unit (CPU), an application processor (AP), a graphics processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application to control at least one of another element (e.g., a hardware or a software element) connected to the processor 120 and may process and compute various data. The processor 120 may load a command or data, which is received from at least one of other elements (e.g., the communication module 190), into a volatile memory 132 to process the command or data and may store the processed result data in a nonvolatile memory 134.

The memory 130 may include, for example, the volatile memory 132 or the nonvolatile memory 134. The volatile memory 132 may include, for example, a random access memory (RAM) (e.g., a dynamic RAM (DRAM), a static RAM (SRAM), or a synchronous dynamic RAM (SDRAM)). The nonvolatile memory 134 may include, for example, a one-time programmable read-only memory (OT-PROM), a programmable read-only memory (PROM), an erasable programmable read-only memory (EPROM), an electrically erasable programmable read-only memory (EE-PROM), a mask ROM, a flash ROM, a flash memory, a hard disk drive, or a solid-state drive (SSD). In addition, the nonvolatile memory 134 may be configured in the form of an internal memory 136 or an external memory 138 which is available through connection only if necessary, according to the connection with the electronic device 101. The external memory 138 may further include a flash drive such as compact flash (CF) drive, a secure digital (SD) memory card, a micro secure digital (micro-SD) memory card, a mini SD (mini-SD) memory card, an extreme digital (xD) memory card, a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software element, such as an instruction or data associated with the program 140, of the electronic device 101. The program 140 may include, for example, a kernel 141, a library 143, an application framework 145 or an application program (application) 147.

The input device 150 may include a microphone, a mouse, or a keyboard. According to an embodiment, the keyboard may include a keyboard physically connected or a keyboard virtually displayed through the display 160.

The display 160 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display 160 may be flexibly, transparently, or wearably implemented. The display 160 may include touch circuitry, which is capable of detecting a user's input such as a gesture input, a proximity input, or a hovering input or a pressure sensor (interchangeably, a force sensor) which is capable of measuring a pressure of a touch. The touch circuit or the pressure sensor may be implemented integrally with the display 160 or may be implemented with at least one sensor separately from the display 160. The hologram device may show a stereoscopic image in the air using the interference of light. The projector may project light onto a screen to display an image. The screen may be located inside or outside the electronic device 101.

The audio module 170 may convert, for example, a sound to an electrical signal or from an electrical signal to a sound. According to an embodiment, the audio module 170 may acquire sound through the input device 150 (e.g., a microphone) or may output sound through an output device (e.g., a speaker or a receiver) included in the electronic device 101, the electronic device 102 (e.g., a wireless speaker or a wireless headphone) or an electronic device 106 (e.g., a wired speaker or a wired headphone) connected with the electronic device 101.

The sensor module 176 may measure or detect, for example, an internal operating state (e.g., power or temperature) or an external environment state (e.g., an altitude, a humidity, or brightness) of the electronic device 101 to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an electronic nose (e-nose) sensor, an electromyography (EMG) sensor, an electroencephalogram (EEG) sensor, an electrocardiogram (ECG) sensor, a temperature sensor, a humidity sensor, an illuminance sensor, or an ultra violet (UV) light sensor. The sensor module 176 may further include a control circuit for controlling at least one or more sensors included therein. According to an embodiment, the electronic device 101 may control the sensor module 176 by using the processor 120 or a processor (e.g., a sensor hub) separate from the processor 120. In a case where a separate processor (e.g., a sensor hub) is used while the processor 120 is in a reduced power or sleep state, the electronic device 101 may control at least part of the operation or the state of the sensor module 176 by the operation of the separate processor without increasing the power of or awakening the processor 120.

According to an embodiment, the interface 177 may include a high definition multimedia interface (HDMI), a USB, an optical interface, a recommended standard 232 (RS-232), a D-subminiature (D-sub) connector, a mobile high-definition link (MHL) interface, an SD card/MMC interface, or an audio interface. A connector 178 may physically connect the electronic device 101 and the electronic device 106. The connector 178 may include, for example, a USB connector, an SD card/MMC connector, or an audio connector (e.g., a headphone connector).

The haptic module 179 may convert an electrical signal into mechanical stimulation (e.g., a vibration or a motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which manages the power of the electronic device 101, may constitute at least a portion of a power management integrated circuit (PMIC).

The battery 189 may include a primary cell, a secondary cell, or a fuel cell and may be recharged by an external power source to supply power to at least one element of the electronic device 101.

The communication module 190 may establish a communication channel between the electronic device 101 and the first external electronic device 102, the second external electronic device 104, or the server 108. The communication module 190 may support wired communication or wireless communication through the established communication channel. According to an embodiment, the communication module 190 may include a wireless communication module 192 or a wired communication module 194. The communication module 190 may communicate with the external device through a first network 198 (e.g. a wireless local area network such as Bluetooth or an Infrared Data Association (IrDA) standard) or a second network 199 (e.g., a wireless wide area network such as a cellular network) through a relevant module among the wireless communication module 192 or the wired communication module 194.

The wireless communication module 192 may support, for example, cellular communication, local wireless communication, and GNSS communication. The cellular communication may include, for example, long-term evolution (LTE), LTE advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be used interchangeably.

According to an embodiment, when the wireless communication module 192 supports cellar communication, the wireless communication module 192 may, for example, identify or authenticate the electronic device 101 within a communication network using the subscriber identification module (e.g., a SIM card) 196. The wireless communication module 192 may include a CP separate from the processor 2820 (e.g., an AP). In this case, the communication processor may perform at least a portion of functions associated with at least one of elements 110 to 196 of the electronic device 101 in substitution of the processor 120 when the processor 120 is in an inactive (sleep) state, and together with the processor 120 when the processor 120 is in an active state. The wireless communication module 192 may include a plurality of communication modules, each supporting only a relevant communication scheme among cellular communication, short-range wireless communication, or a GNSS communication scheme.

The wired communication module 194 may include, for example, a local area network (LAN) service, a power line communication, or a plain old telephone service (POTS).

For example, the first network 198 may employ, for example, Wi-Fi direct or Bluetooth for transmitting or receiving instructions or data through a wireless direct connection between the electronic device 101 and the first external electronic device 102. The second network 199 may include a telecommunication network (e.g., a computer network such as a LAN or a wide area network (WAN), the Internet or a telephone network) for transmitting or receiving instructions or data between the electronic device 101 and the second electronic device 104.

According to an embodiment, the instructions or the data may be transmitted or received between the electronic device 101 and the second external electronic device 104 through the server 108 connected with the second network 199. Each of the external first and second external electronic devices 102 and 104 may be a device of a different type or the same type as that of the electronic device 101. All or a part of the operations of the electronic device 101 may be executed by the electronic devices 102 and 104 or the server 108. In a case where the electronic device 101 executes any function or service automatically or in response to a request, the electronic device 101 might not perform the function or the service internally, but may alternatively or additionally transmit requests for at least a part of a function associated with the electronic device 101 to the electronic device 102 or 104 or the server 108. The electronic device 102 or 104 or the server 108 may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
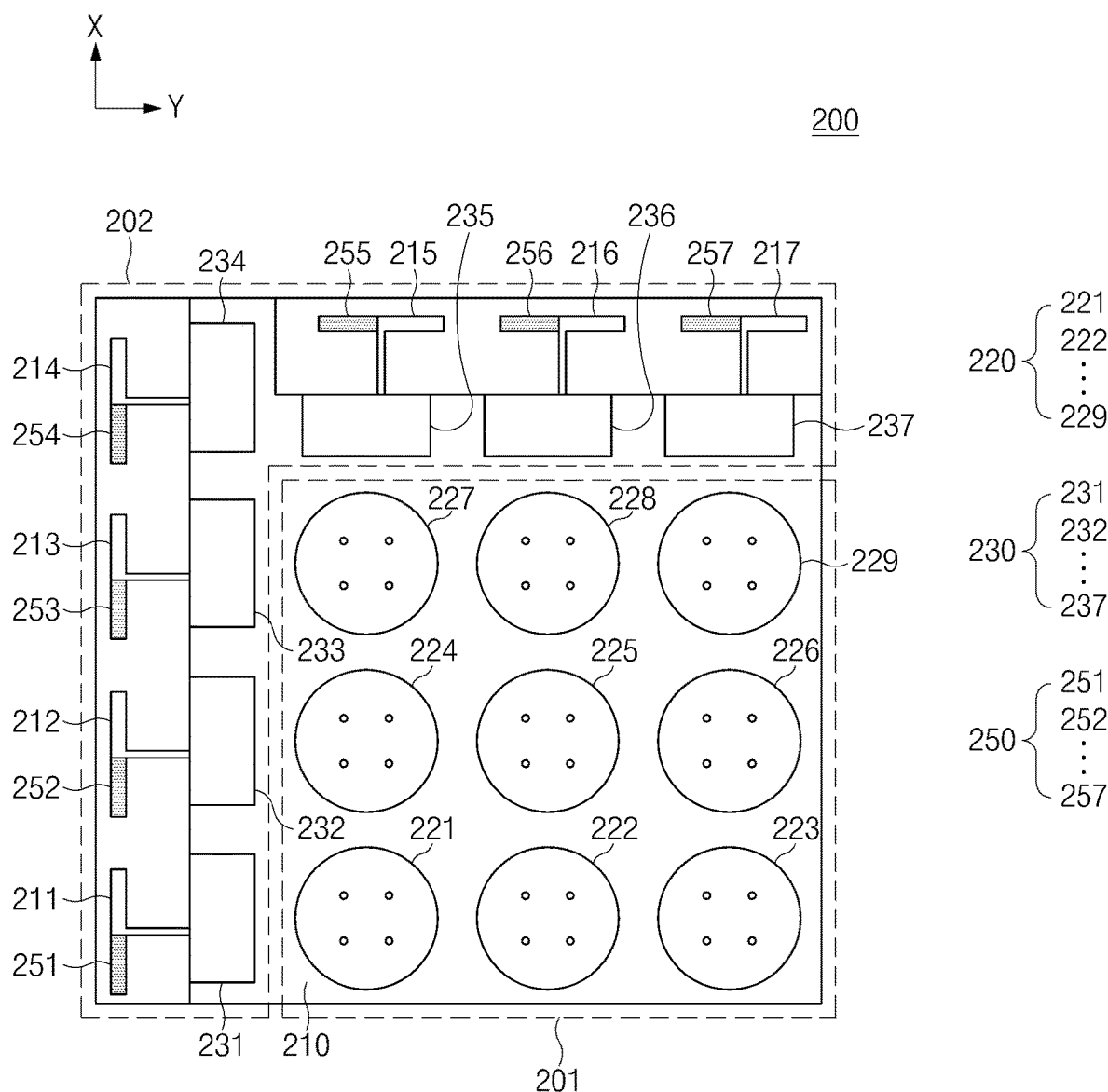
FIG. 2 is a plan view of an antenna device included in an electronic device, according to an embodiment.

FIG. 2 is a plan view of an antenna device included in an electronic device, according to an embodiment.

Referring to FIG. 2, an antenna device 200 may include a broad-side antenna array 201 and an end-fire antenna array 202. For example, the size of the antenna device 200 may be approximately 20.0 mm×20.0 mm×0.4 mm. The antenna device 200 may be mounted in an electronic device (e.g., the electronic device 101 of FIG. 1). The antenna device 200 may be electrically connected to a communication circuit (e.g., the communication module 190 of FIG. 1), and may receive a signal from an external device or transmit the signal to the external device.

According to an embodiment, the broad-side antenna array 201 may include a plurality of circular patches 220. The plurality of circular patches 220 may operate as a radiator. For example, the plurality of circular patches 220 may be arranged in the form of a 3×3 array on a ground member. For example, the radius of each of the plurality of circular patches 220 may be approximately 2.0 mm; the distance between the ground member and each of the plurality of circular patches 220 may be approximately 0.4 mm; and the distance between the plurality of circular patches 220 (e.g., the distance between the center point of one circular patch and the center point of a neighboring circular patch) may be approximately 5.0 mm.

According to an embodiment, the end-fire antenna array 202 may be disposed adjacent to one end of the broad-side antenna array 201. For example, the end-fire antenna array 202 may be disposed adjacent to the upper end and left-side end of the broad-side antenna array 201.

According to an embodiment, the end-fire antenna array 202 may include a plurality of square patches 230 disposed adjacent to the broad-side antenna array 201. The distance between the plurality of square patches 230 (e.g., the distance between the center point of one square patch and the center point of a neighboring square patch) may be approximately 5.0 mm. Each of the plurality of square patches 230 may be a radiator for vertical polarization.

According to an embodiment, the end-fire antenna array 202 may include a plurality of straight radiators 250 disposed adjacent to the plurality of extensions 211 to 217 of the ground member. The plurality of straight radiators 250 may be a radiator for horizontal polarization. For example, a first straight radiator 251 may be a dipole antenna together with the first extension part 211 connected to the ground member. For example, a second to seventh straight radiators 252 to 257 may be the dipole antenna together with the second to seventh extension parts 212 to 217, respectively.

According to an embodiment, the antenna device 200 may include a substrate that supports the ground member, the plurality of circular patches 220, the plurality of square patches 230, the plurality of straight radiators 250, and the like. For example, the substrate may be composed of a plurality of layers. The relative permittivity of the substrate may be, for example, approximately 3.5.

Figure 3:
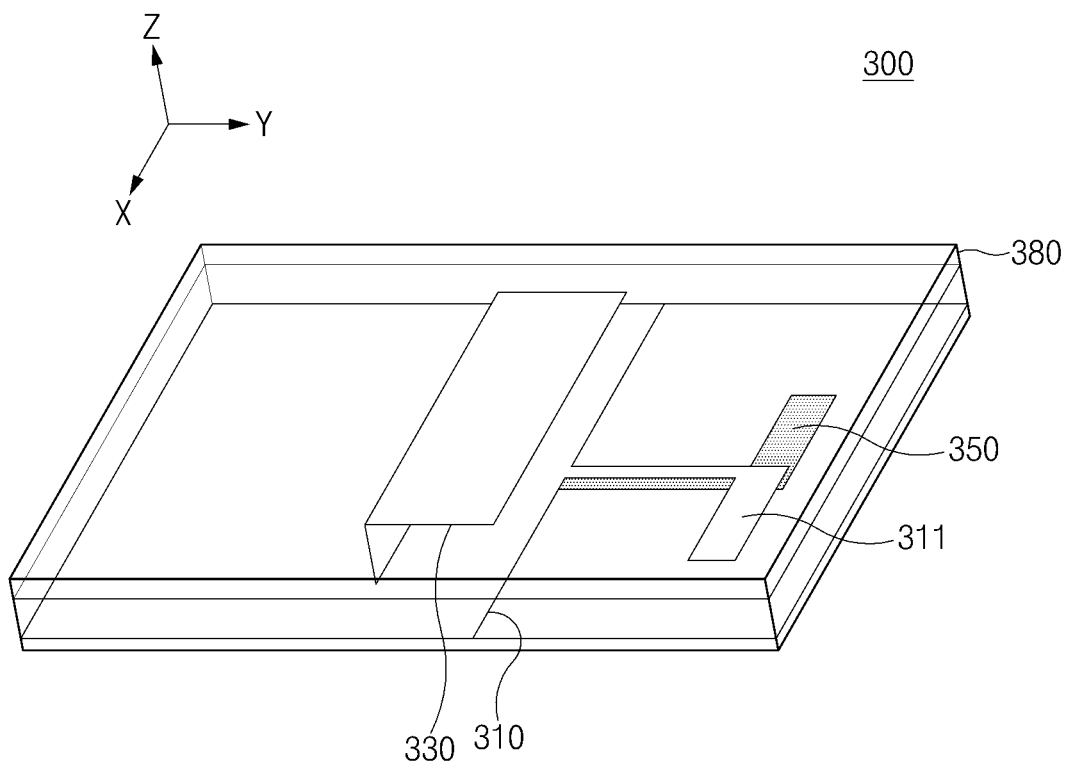
FIG. 3 is a perspective view of an antenna device included in an electronic device, according to an embodiment.

FIG. 3 is a perspective view of an antenna device 300 included in an electronic device, according to an embodiment.

Referring to FIG. 3, the antenna device 300 may include a ground member 310, a patch-type radiator 330, a straight radiator 350, and a substrate 380. The antenna device 300 shown in FIG. 3 may be a part of the end-fire antenna array 202 shown in FIG. 2.

According to an embodiment, the ground member 310 may be a conductive plate. The ground member 310 may include the plane part and an extension part 311 extending in a first direction (e.g., the Y-axis direction) from one end of the plane part. The first direction may be, for example, a direction away from the plane part of the ground member 310. The plane part of the ground member 310 may be formed smoothly. The extension part 311 of the ground member 310 may include a first part extending in a first direction from the left-side end of the plane part and a second part extending in a second direction (e.g., the X-axis direction) from the end of the first part. For example, the second direction may be perpendicular to the first direction. The extension part 311 may operate as the radiator of a dipole antenna.

According to an embodiment, the patch-type radiator 330 may be disposed on the plane part of the ground member 310. For example, the patch-type radiator 330 may be L-shaped when viewed in the X-axis direction. The patch-type radiator 330 may include a first part disposed in parallel with the plane part and a second part extending from one end of the first part toward the plane part. The second part may be in contact with the plane part of the ground member 310 or may be spaced apart from the plane part of the ground member 310. The first part and the second part may be in the form of a rectangle. The patch-type radiator 330 and the plane part of the ground member 310 may operate as a patch antenna. The patch-type radiator 330 may be fed through one point of the first part of the patch-type radiator 330. The patch-type radiator 330 may be formed to radiate vertical polarization. The patch-type radiator 330 may mainly radiate vertical polarization in a first direction (e.g., the Y-axis direction).

According to an embodiment, the straight radiator 350 may be spaced apart from the ground member 310 and may be disposed adjacent to the extension part 311 of the ground member 310. The straight radiator 350 may be disposed below the ground member 310 or may be disposed above the ground member 310. For example, the straight radiator 350 may be L-shaped when viewed in the Z-axis direction. The straight radiator 350 may extend in the first direction. For example, the straight radiator 350 may include a first part extending in the first direction and a second part extending in a third direction (e.g., a direction opposite to the X-axis direction) from one end of the first part. For example, the third direction may be a direction opposite to the second direction. The location where the straight radiator 350 is bent may correspond to the location where the extension part 311 of the ground member 310 is bent. The straight radiator 350 and the extension part 311 of the ground member 310 may operate as a dipole antenna. The straight radiator 350 may be fed through the opposite end of the first part of the straight radiator 350. For example, the straight radiator 350 and the extension part 311 may be a dipole antenna. The straight radiator 350 and extension part 311 may be formed to radiate horizontal polarization. The straight radiator 350 and extension part 311 may mainly radiate horizontal polarization in the first direction (e.g., the Y-axis direction).

According to an embodiment, the substrate 380 may include a plurality of layers. The relative permittivity of the substrate 380 may be approximately 3.5. The substrate 380 may support the ground member 310, the patch-type radiator 330, and the straight radiator 350.

Figure 4:
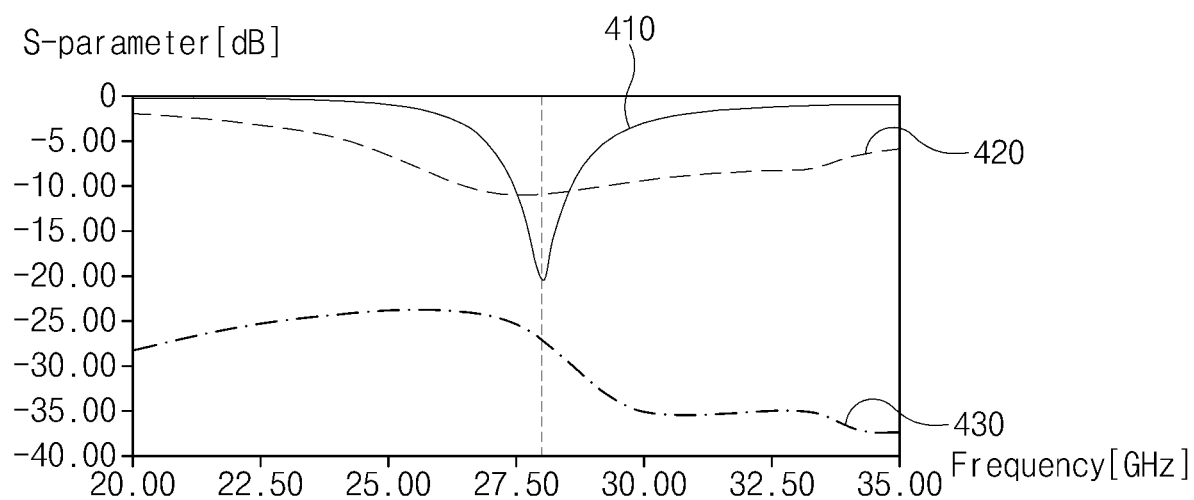
FIG. 4 is a graph illustrating a reflection coefficient and isolation according to a frequency of an antenna device included in an electronic device, according to an embodiment.

FIG. 4 is a graph illustrating a reflection coefficient and isolation according to a frequency of an antenna device included in an electronic device, according to an embodiment.

Referring to FIG. 4, a solid line 410 represents the reflection coefficient of a patch antenna including the patch-type radiator 330 shown in FIG. 3; a dash line 420 represents the reflection coefficient of a dipole antenna including the straight radiator 350 shown in FIG. 3; and a chain line 430 represents the transmission coefficient between the patch antenna and the dipole antenna.

It is indicated that the reflection coefficient of the patch antenna and the reflection coefficient of the dipole antenna are less than −10 dB at the target frequency of 28 GHz. As such, it may be verified that the performances of the patch antenna and the dipole antenna included in the antenna device 300 are sufficient to radiate a signal of 28 GHz.

It is indicated that the transmission coefficient between the patch antenna and the dipole antenna is less than −25 dB at the target frequency of 28 GHz. As such, it may be verified that the patch antenna and the dipole antenna are electrically and sufficiently isolated from each other.

Figure 5A:
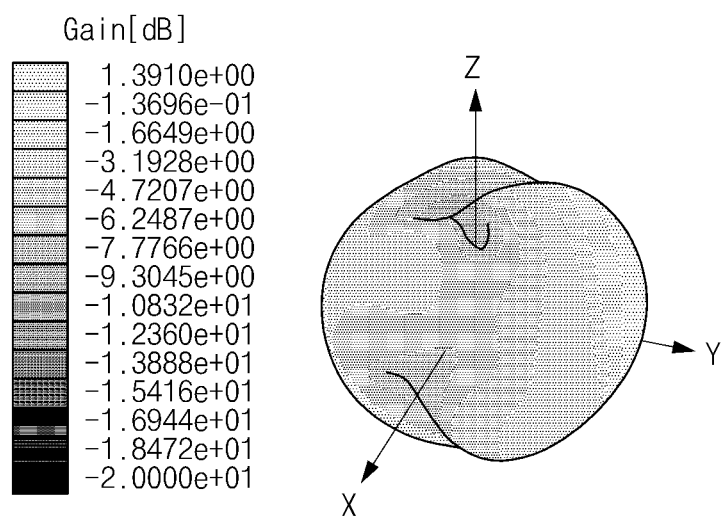
FIGS. 5A and 5B are graphs illustrating a gain according to a direction of an antenna device included in an electronic device, according to an embodiment.
Figure 5B:
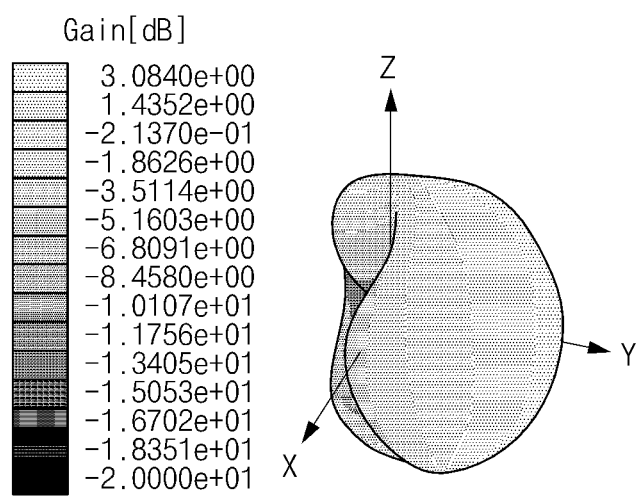

FIGS. 5A and 5B are graphs illustrating a gain according to a direction of an antenna device included in an electronic device, according to an embodiment.

FIG. 5A illustrates the gain according to the direction of a patch antenna including the patch-type radiator 330 shown in FIG. 3.

Referring to FIG. 5A, the gain of the patch antenna may be a maximum in the Y-axis direction. The maximum value of the gain of the patch antenna may be approximately 1.4 dB.

FIG. 5B illustrates the gain according to the direction of a dipole antenna including the straight radiator 350 shown in FIG. 3.

Referring to FIG. 5B, the gain of the dipole antenna may be a maximum in the Y-axis direction. The maximum value of the gain of the dipole antenna may be approximately 3.1 dB.

Figure 6:
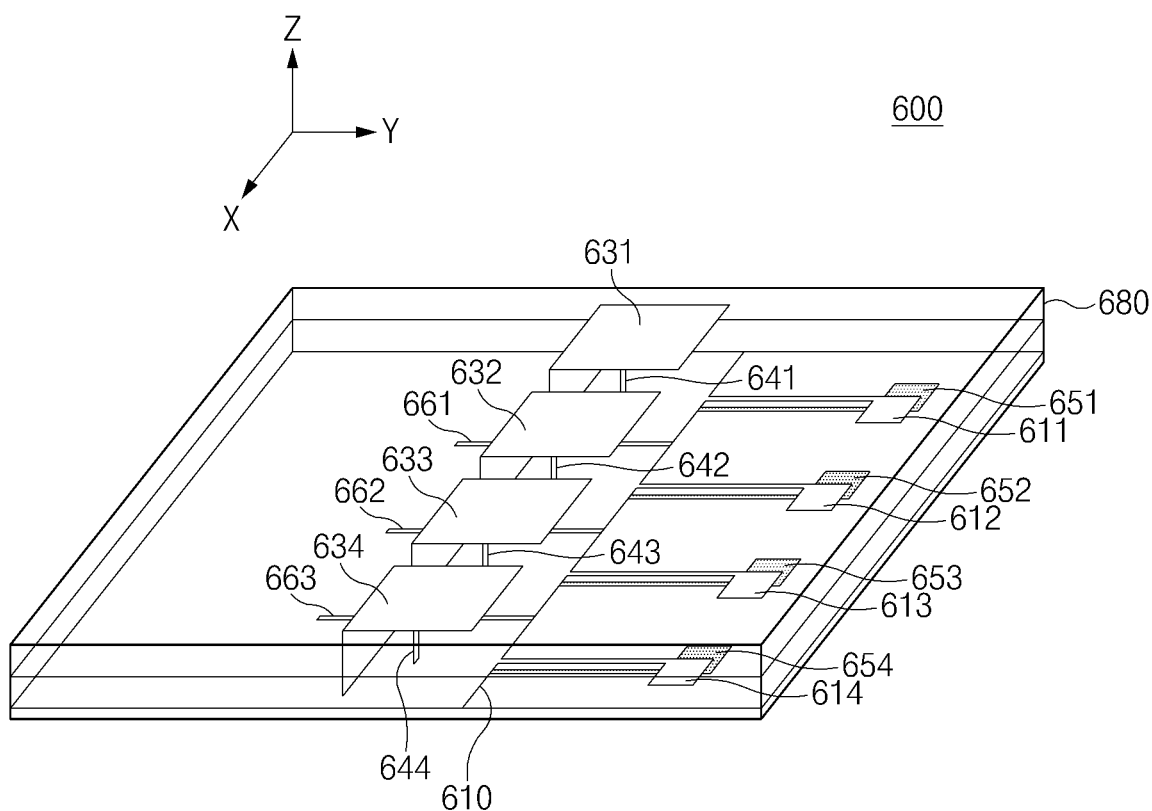
FIG. 6 is a perspective view of an antenna device included in an electronic device, according to an embodiment.

FIG. 6 is a perspective view of an antenna device 600 included in an electronic device, according to an embodiment.

Figure 7:
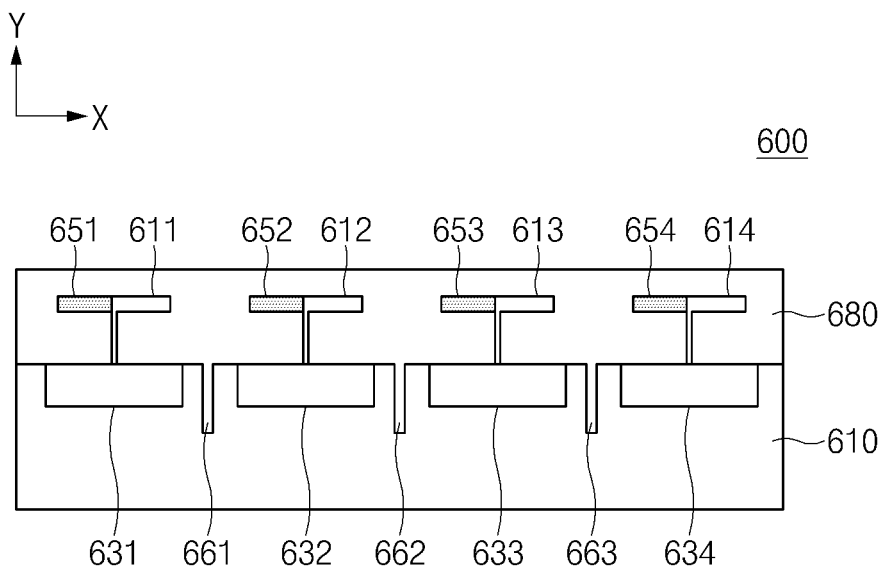
FIG. 7 is a plan view of an antenna device included in an electronic device, according to an embodiment.

FIG. 7 is a plan view of the antenna device 600 included in an electronic device, according to an embodiment.

Referring to FIGS. 6 and 7, the antenna device 600 may include a ground member 610, a plurality of patch-type radiators 630, a plurality of feeding lines 640, a plurality of straight radiators 650, and a substrate 680.

According to an embodiment, the ground member 610 may be a conductive plate. The ground member 610 may include a plane part and a plurality of extension parts 611 to 614. The plane part of the ground member 610 may be formed smoothly. Each of the plurality of extension parts 611 to 614 of the ground member 610 may extend in a first direction (e.g., the Y-axis direction) from one end (e.g., a right-side end) of the plane part. The plurality of extension parts 611 to 614 of the ground member 610 may be arranged at regular intervals along the second direction (e.g., the X-axis direction). The plurality of extension parts 611 to 614 may operate as a dipole radiator. For example, the first extension part 611 may extend from a first point of the ground member 610 in the Y-axis direction. The second extension part 612 may extend in the Y-axis direction from a second point, which is spaced apart from the first point by a certain distance in the X-axis direction. The third extension part 613 may extend in the Y-axis direction from a third point, which is spaced apart from the second point by a certain distance in the X-axis direction. The fourth extension part 614 may extend in the Y-axis direction from a fourth point, which is spaced apart from the third point by a certain distance in the X-axis direction. Each of the plurality of extension parts 611 to 614 of the ground member 610 may be implemented to be the same as or similar to the extension parts 311 of FIG. 3.

According to an embodiment, the plurality of patch-type radiators 630 may be disposed on the plane part of the ground member 610. For example, a first patch-type radiator 631 may be disposed on an area spaced apart from the first extension part 611 of the ground member 610 by a certain distance in the direction opposite to the Y-axis direction. A second patch-type radiator 632 may be disposed on an area spaced apart from the second extension part 612 of the ground member 610 by a certain distance in the direction opposite to the Y-axis direction. A third patch-type radiator 633 may be disposed on an area spaced apart from the third extension part 613 of the ground member 610 by a certain distance in the direction opposite to the Y-axis direction. A fourth patch-type radiator 634 may be disposed on an area spaced apart from the fourth extension part 614 of the ground member 610 by a certain distance in the direction opposite to the Y-axis direction. The height of each of the plurality of patch-type radiators 630 may be approximately 0.6 mm, and the distance between two radiators, which are adjacent to each other, from among the plurality of patch-type radiators 630 may be approximately 5.5 mm. Each of the plurality of patch-type radiators 630 may be implemented to be the same as or similar to the patch-type radiator 330 of FIG. 3. The plurality of patch-type radiators 630 and the plane part of the ground member 610 may operate as a patch antenna array.

According to an embodiment, the plurality of feeding lines 640 may be electrically connected to one point of each of the plurality of patch-type radiators 630. For example, a first feeding line 641, a second feeding line 642, a third feeding line 643, and a fourth feeding line 644 may be connected to one point of the first patch-type radiator 631, one point of the second patch-type radiator 632, one point of the third patch-type radiator 633, and one point of the fourth patch-type radiator 634, respectively. The plurality of feeding lines 640 may extend under the ground member 610 through a plurality of holes formed in the ground member 610 and may be electrically connected to a communication circuit (e.g., the communication module 190 in FIG. 1) under the ground member 610.

According to an embodiment, the plurality of straight radiators 650 may be arranged to be adjacent to the plurality of extension parts 611 to 614 of the ground member 610, respectively. For example, each of the plurality of straight radiators 650 may be spaced apart from the ground member 610 and may be respectively arranged adjacent to each of the plurality of extension parts 611 to 614. For example, a first straight radiator 651, a second straight radiator 652, a third straight radiator 653, and a fourth straight radiator 654 may be disposed adjacent to the first extension part 611, the second extension part 612, the third extension part 613, and the fourth extension part 614, respectively. The distance between the plurality of straight radiators 650 and the plurality of extension parts 611 to 614 may be approximately 0.1 mm. Each of the plurality of straight radiators 650 may be formed to be the same as or similar to the straight radiator 350 of FIG. 3. The plurality of straight radiators 650 and the plurality of extension parts 611 to 614 may operate as a dipole antenna array. One end of each of the plurality of straight radiators 650 may be electrically connected to a communication circuit through a feeding line.

According to an embodiment, the substrate 680 may include a plurality of layers. For example, the relative permittivity of the substrate 680 may be approximately 3.5. The substrate 680 may support the ground member 610, the plurality of patch-type radiators 630, the plurality of feeding lines 640, and the plurality of straight radiators 650.

According to an embodiment, the antenna device 600 may transmit and receive vertical polarization and horizontal polarization by employing the plurality of patch-type radiators 630 for the vertical polarization and the plurality of straight radiators 650 for the horizontal polarization. The space occupied by the antenna device 600 may be reduced by arranging the plurality of patch-type radiators 630 along the X-axis direction and arranging the plurality of straight radiators 650, which extend in the Y-axis direction from a location where the plurality of patch-type radiators 630 are disposed, in the X-axis direction. In this case, since the plurality of patch-type radiators 630 radiate vertical polarization and the plurality of straight radiators 650 radiate horizontal polarization, the coupling between the plurality of patch-type radiators 630 and the plurality of straight radiators 650 might not deteriorate the performance of the antenna device 600.

According to an embodiment, a plurality of slits 660 may be formed in the plane part of the ground member 610. For example, the plurality of slits 660 may be respectively positioned in gaps between the plurality of extension parts 611 to 614. The plurality of slits 660 may be respectively positioned in gaps between areas where the plurality of patch-type radiators 630 are disposed. For example, a first slit 661 may be interposed between an area where the first patch-type radiator 631 is disposed and an area where the second patch-type radiator 632 is disposed. A second slit 662 may be interposed between an area where the second patch-type radiator 632 is disposed and an area where the third patch-type radiator 633 is disposed. A third slit 663 may be interposed between an area where the third patch-type radiator 633 is disposed and an area where the fourth patch-type radiator 634 is disposed. The plurality of patch-type radiators 630 may be electrically isolated from each other due to the plurality of slits 660.

Figure 8:
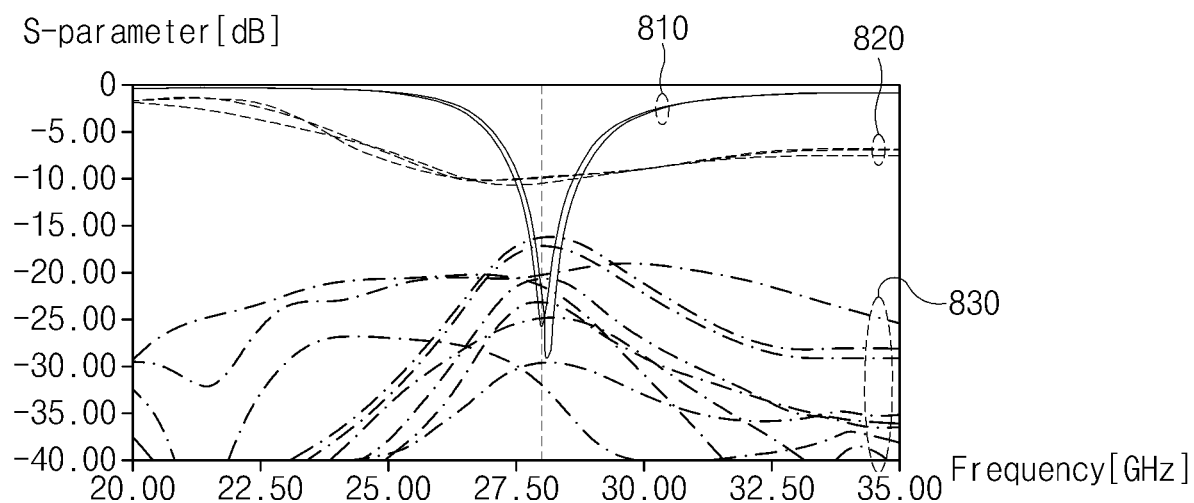
FIG. 8 is a graph illustrating a reflection coefficient and isolation according to a frequency of an antenna device included in an electronic device, according to an embodiment.

FIG. 8 is a graph illustrating a reflection coefficient and isolation according to a frequency of an antenna device included in an electronic device, according to an embodiment.

Referring to FIG. 8, solid lines 810 represent the reflection coefficients of the plurality of patch-type radiators 630 shown in FIG. 6, respectively; dash lines 820 represent the reflection coefficients of the plurality of straight radiators 650 shown in FIG. 6, respectively; and chain lines 830 represent the transmission coefficients between the two radiators among the plurality of patch-type radiators 630 and a plurality of straight radiators 650 shown in FIG. 6, respectively.

It is indicated that the reflection coefficient of each of the plurality of patch-type radiators 630 and the reflection coefficient of each of the plurality of straight radiators 650 are not greater than −10 dB at 28 GHz which is the target frequency. As such, it may be verified that the performances of the patch antenna array and the dipole antenna array included in the antenna device 600 illustrated in FIG. 6 are sufficient to radiate a signal of 28 GHz.

It is indicated that the transmission coefficient between two radiators among the plurality of patch-type radiators 630 and the plurality of straight radiators 650 is not greater than −15 dB at 28 GHz which is the target frequency. Accordingly, it may be verified that antennas included in the patch antenna array and the dipole antenna array are electrically and sufficiently isolated from each other at 28 GHz.

Figure 9A:
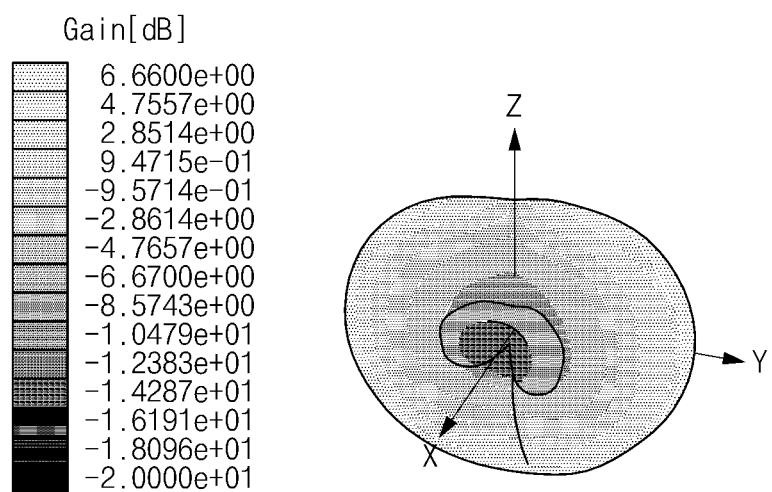
FIGS. 9A and 9B are graphs illustrating a gain according to a direction of an antenna device included in an electronic device, according to an embodiment.
Figure 9B:
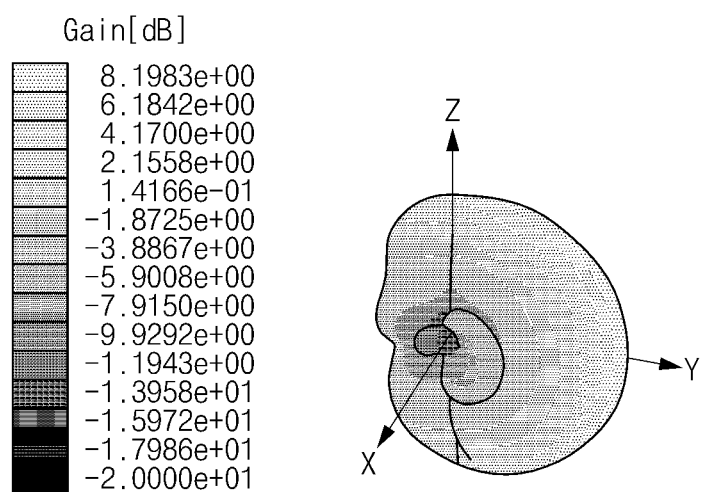

FIGS. 9A and 9B are graphs illustrating a gain according to a direction of an antenna device included in an electronic device, according to an embodiment.

FIG. 9A illustrates the gain according to the direction of a patch antenna array including the plurality of patch-type radiators 630 shown in FIG. 6.

Referring to FIG. 9A, the gain of the patch antenna array may be a maximum in the Y-axis direction. The maximum value of the gain of the patch antenna array may be approximately 6.7 dB.

FIG. 9B illustrates the gain according to the direction of a dipole antenna array including the plurality of straight radiators 650 shown in FIG. 6.

Referring to FIG. 9B, the gain of the dipole antenna array may be a maximum in the Y-axis direction. The maximum value of the gain of the dipole antenna array may be approximately 8.2 dB.

According to an embodiment, the gain of the antenna device 600 illustrated in FIG. 6 may be improved by employing the plurality of patch-type radiators 630 and the plurality of straight radiators 650.

Figure 10:
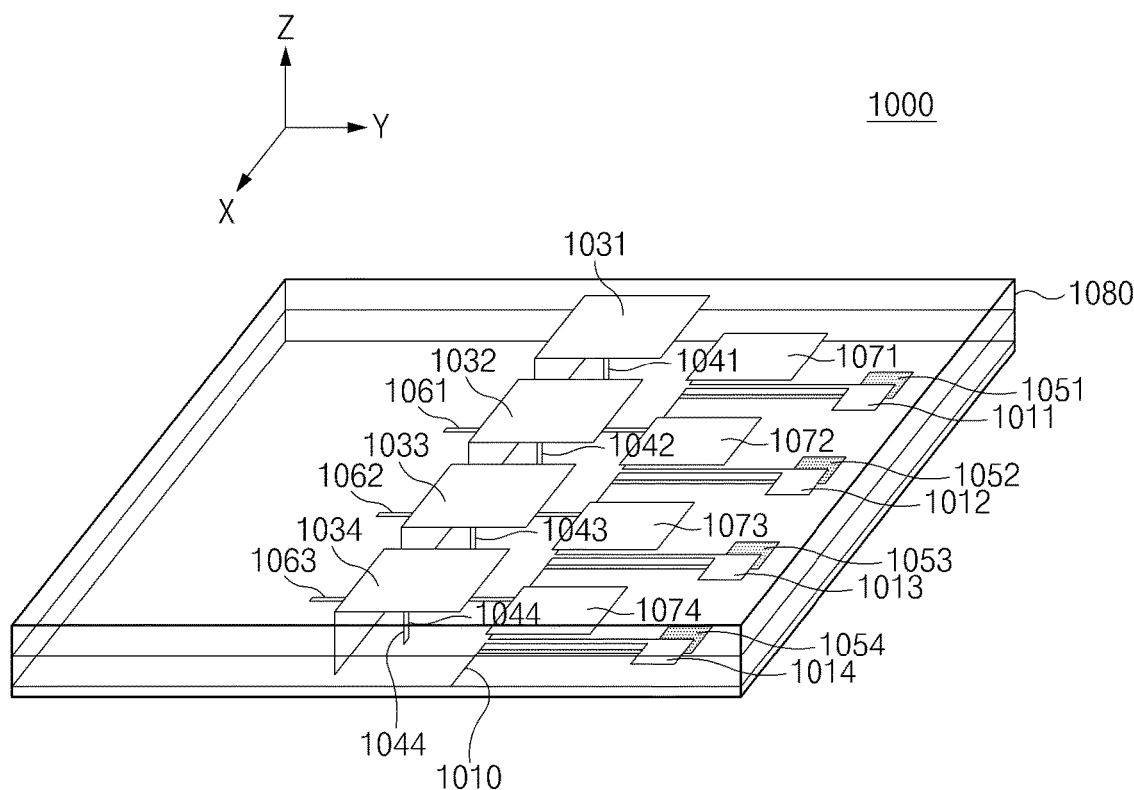
FIG. 10 is a perspective view of an antenna device included in an electronic device, according to an embodiment.
Figure 11:
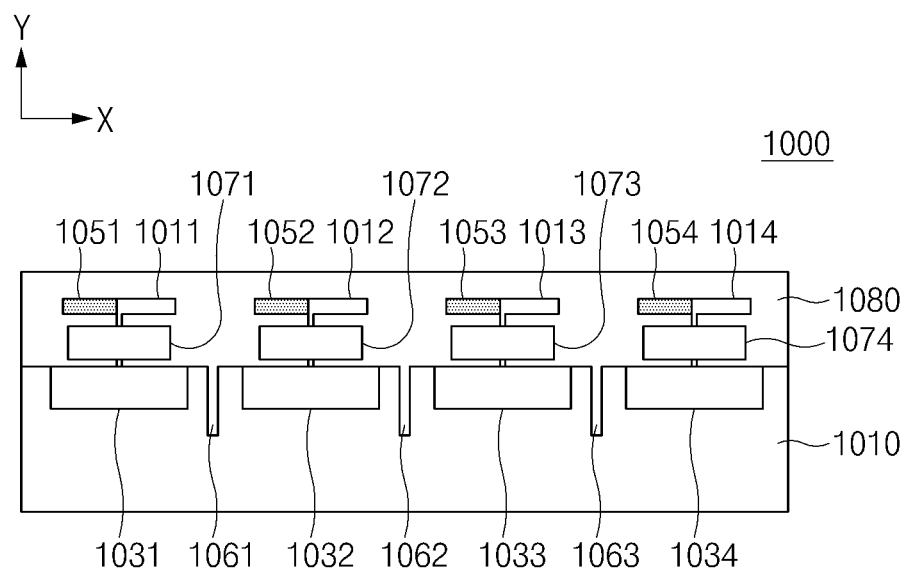
FIG. 11 is a plan view of an antenna device included in an electronic device, according to an embodiment.

FIG. 10 is a perspective view of an antenna device 1000 included in an electronic device, according to an embodiment. FIG. 11 is a plan view of the antenna device 1000 included in an electronic device, according to an embodiment.

Referring to FIGS. 10 and 11, the antenna device 1000 may include a ground member 1010, a plurality of patch-type radiators 1030, a plurality of feeding lines 1040, a plurality of straight radiators 1050, a plurality of slits 1060, a plurality of conductive members 1070, and a substrate 1080. The ground member 1010, the plurality of patch-type radiators 1030, the plurality of feeding lines 1040, the plurality of straight radiators 1050, the plurality of slits 1060, and the substrate 1080 may be implemented to be the same as or similar to the ground member 610, the plurality of patch-type radiators 630, the plurality of feeding lines 640, the plurality of straight radiators 650, the plurality of slits 660, and the substrate 680 of FIGS. 6 and 7, respectively. A description of the ground member 1010, the plurality of patch-type radiators 1030, the plurality of feeding lines 1040, the plurality of straight radiators 1050, the plurality of slits 1060, and the substrate 1080 is not repeated here.

According to an embodiment, each of the plurality of conductive members 1070 may be interposed between the patch-type radiator 1030 and the straight radiator 1050. For example, a first conductive member 1071 may be interposed between a first patch-type radiator 1031 and a first straight radiator 1051. A second conductive member 1072 may be interposed between a second patch-type radiator 1032 and a second straight radiator 1052. A third conductive member 1073 may be interposed between a third patch-type radiator 1033 and a third straight radiator 1053. A fourth conductive member 1074 may be interposed between a fourth patch-type radiator 1034 and a fourth straight radiator 1054. The plurality of conductive members 1070 may be disposed on a plurality of extension parts 1011 to 1014 of the ground member 1010, respectively. For example, the first conductive member 1071 may be disposed on the first extension part 1011 and the first straight radiator 1051 and may be disposed at a location spaced from the first patch-type radiator 1031 in the Y-axis direction. The second conductive member 1072 may be disposed on the second extension part 1012 and the second straight radiator 1052 and may be disposed at a location spaced from the second patch-type radiator 1032 in the Y-axis direction. The third conductive member 1073 may be disposed on the third extension part 1013 and the third straight radiator 1053 and may be disposed at a location spaced from the third patch-type radiator 1033 in the Y-axis direction. The fourth conductive member 1074 may be disposed on the fourth extension part 1014 and the fourth straight radiator 1054 and may be disposed at a location spaced from the fourth patch-type radiator 1034 in the Y-axis direction. Each of the plurality of conductive members 1070 may have a square shape.

According to an embodiment, a plurality of conductive members 1070 may be disposed to direct vertical polarization and to reflect horizontal polarization. For example, each of a plurality of conductive members 1070 may be used as the director of the patch antenna array including the plurality of patch-type radiators 1030. For example, each of the plurality of conductive members 1070 may be used as the reflector of the dipole antenna array including the plurality of straight radiators 1050.

The gain and efficiency of the antenna device 1000 may be improved by employing the plurality of conductive members 1070 used as the director of the patch antenna array and the reflector of the dipole antenna array.

Figure 12:
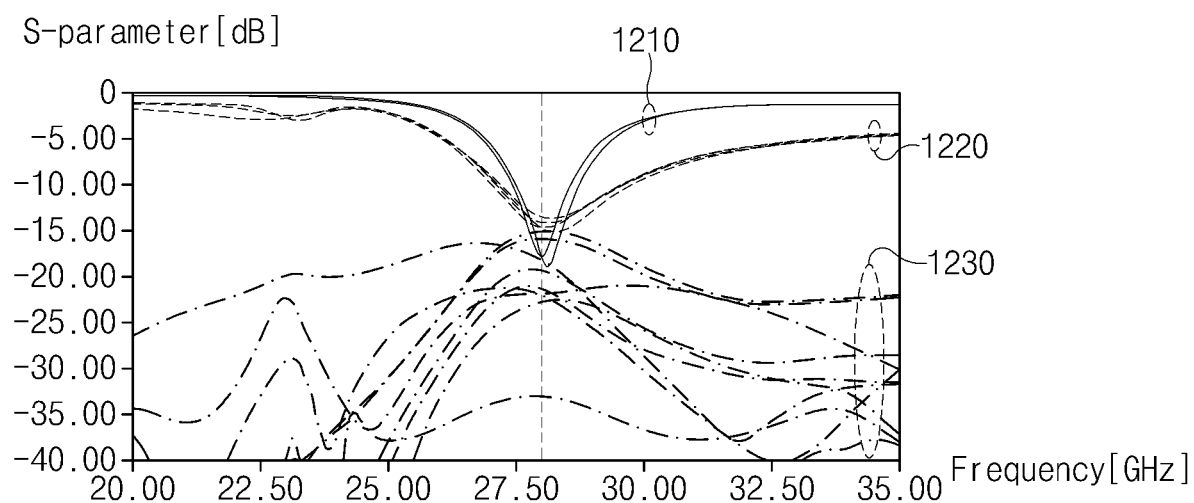
FIG. 12 is a graph illustrating a reflection coefficient and isolation according to a frequency of an antenna device included in an electronic device, according to an embodiment.

FIG. 12 is a graph illustrating a reflection coefficient and isolation according to a frequency of an antenna device included in an electronic device, according to an embodiment.

Referring to FIG. 12, solid lines 1210 represent the reflection coefficients of the plurality of patch-type radiators 1030 shown in FIG. 10, respectively; dash lines 1220 represent the reflection coefficients of the plurality of straight radiators 1050 shown in FIG. 10, respectively; and chain lines 1230 represent the transmission coefficients between the two radiators among the plurality of patch-type radiators 1030 and the plurality of straight radiators 1050, respectively.

It is indicated that the reflection coefficient of each of the plurality of patch-type radiators 1030 and the reflection coefficient of each of the plurality of straight radiators 1050 are not greater than −13 dB at 28 GHz which is the target frequency. As such, it is verified that the efficiency of a radiator, in particular, the plurality of straight radiators 1050 is improved by the plurality of conductive members 1070 illustrated in FIG. 10.

It is indicated that the transmission coefficient between two radiators among the plurality of patch-type radiators 1030 and the plurality of straight radiators 1050 is not greater than −15 dB at 28 GHz which is the target frequency. Accordingly, it may be verified that antennas included in the patch antenna array and the dipole antenna array are electrically and sufficiently isolated from each other at 28 GHz even though the plurality of conductive members 1070 are employed.

Figure 13A:
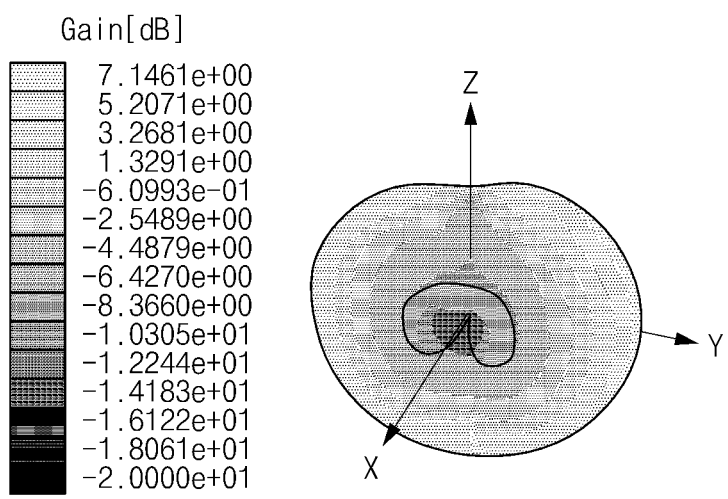
FIGS. 13A and 13B are graphs illustrating a gain according to a direction of an antenna device included in an electronic device, according to an embodiment.
Figure 13B:
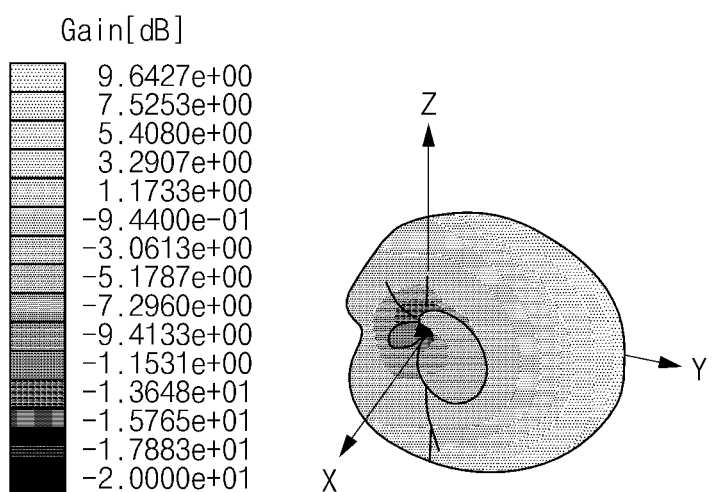

FIGS. 13A and 13B are graphs illustrating a gain according to a direction of an antenna device included in an electronic device, according to an embodiment.

FIG. 13A illustrates the gain according to the direction of a patch antenna array including the plurality of patch-type radiators 1030 shown in FIG. 10.

Referring to FIG. 13A, the gain of the patch antenna array may be a maximum in the Y-axis direction. The maximum value of the gain of the patch antenna array may be approximately 7.1 dB.

FIG. 13B illustrates the gain according to the direction of a dipole antenna array including the plurality of straight radiators 1050 shown in FIG. 10.

Referring to FIG. 13B, the gain of the dipole antenna array may be a maximum in the Y-axis direction. The maximum value of the gain of the dipole antenna array may be approximately 9.6 dB.

As such, it is verified that the gain of the patch antenna array and the gain of the dipole antenna array are improved by employing the plurality of conductive members 1070 used as directors and reflectors.

Figure 14:
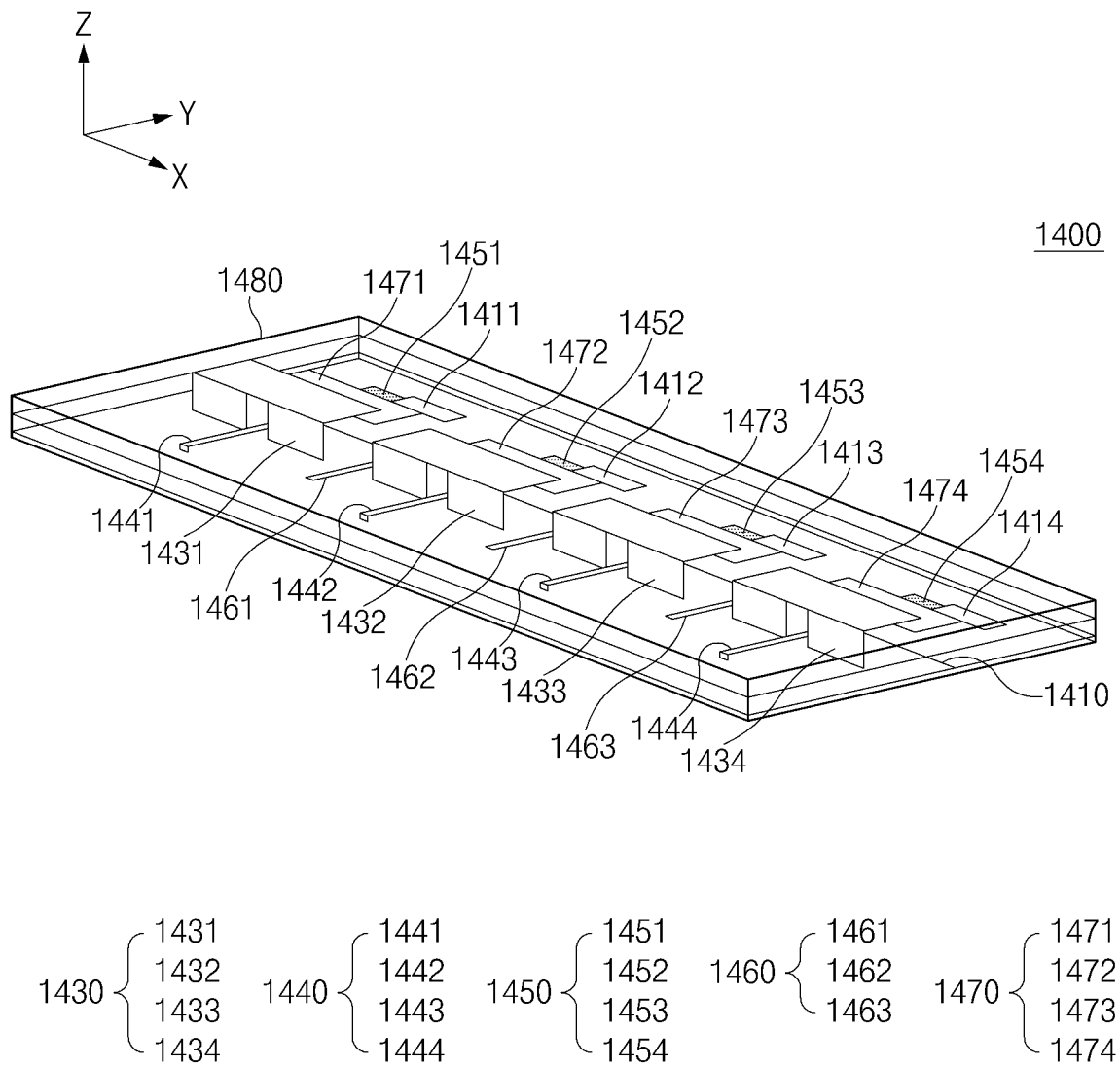
FIG. 14 is a perspective view of an antenna device included in an electronic device, according to an embodiment.

FIG. 14 is a perspective view of an antenna device 1400 included in an electronic device, according to an embodiment.

Referring to FIGS. 10 and 14, the antenna device 1400 may include a ground member 1410, a plurality of patch-type radiators 1430, a plurality of feeding lines 1440, a plurality of straight radiators 1450, a plurality of slits 1460, a plurality of conductive members 1470, and a substrate 1480. The ground member 1410, the plurality of straight radiators 1450, the plurality of slits 1460, the plurality of conductive members 1470, and the substrate 1480 may be implemented to be the same as or similar to the ground member 1010, the plurality of straight radiators 1050, the plurality of slits 1060, the plurality of conductive members 1070, and the substrate 1080 of FIGS. 10 and 11, respectively. A description of the ground member 1410, the plurality of straight radiators 1450, the plurality of slits 1460, the plurality of conductive members 1470, and the substrate 1480 is not repeated here.

According to an embodiment, each of the plurality of patch-type radiators 1430 may include a first part disposed in parallel with the plane part of the ground member 1410 and a second part extending from one end of the first part toward the plane part of the ground member 1410. A slot may be formed in the second part of each of the plurality of patch-type radiators 1430.

According to an embodiment, the plurality of feeding lines 1440 may be electrically connected to one point of the first part of each of the plurality of patch-type radiators 1430, and may extend through the slot formed in the second part of each of the plurality of patch-type radiators 1430. For example, a first feeding line 1441 may be electrically connected to one point of the first part of a first patch-type radiator 1431. The first feeding line 1441 may extend in a direction opposite to the Z-axis direction and then may extend in a direction opposite to the Y-axis direction. The first feeding line 1441 may pass through the slot formed in the second part of the first patch-type radiator 1431. The first feeding line 1441 may be electrically connected to a communication circuit (e.g., the communication module 190 of FIG. 1) by extending through the slot of the first patch-type radiator 1431. In a manner similar to the first feeding line 1441, a second feeding line 1442, a third feeding line 1443, and a fourth feeding line 1444 may be electrically connected to a second patch-type radiator 1432, a third patch-type radiator 1433, and a fourth patch-type radiator 1434, respectively. As a result, the plurality of feeding lines 1440 may be disposed on the ground member 1410.

Figure 15:
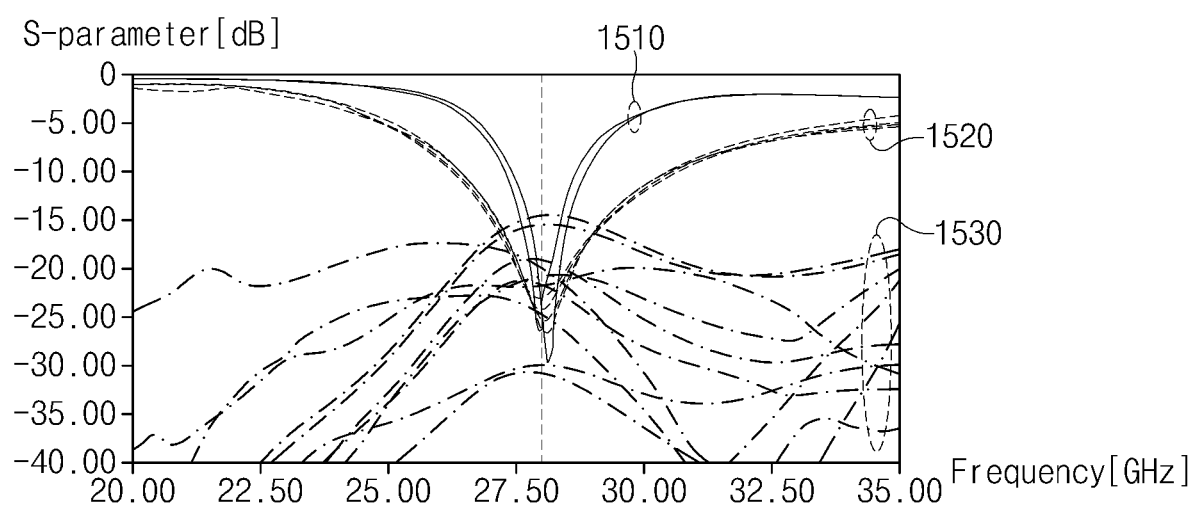
FIG. 15 is a graph illustrating a reflection coefficient and isolation according to a frequency of an antenna device included in an electronic device, according to an embodiment.

FIG. 15 is a graph illustrating a reflection coefficient and isolation according to a frequency of an antenna device included in an electronic device, according to an embodiment.

Referring to FIG. 15, solid lines 1510 represent the reflection coefficients of the plurality of patch-type radiators 1430 shown in FIG. 14, respectively; dash lines 1520 represent the reflection coefficients of the plurality of straight radiators 1450 shown in FIG. 14, respectively; and chain lines 1530 represent the transmission coefficients between the two radiators among the plurality of patch-type radiators 1430 and a plurality of straight radiators 1450, respectively.

It is indicated that the reflection coefficient of each of the plurality of patch-type radiators 1430 and the reflection coefficient of each of the plurality of straight radiators 1450 are not greater than −20 dB at 28 GHz which is the target frequency. As such, it is verified that the efficiency of the plurality of patch-type radiators 1430 and the efficiency of the plurality of straight radiators 1050 are improved by changing the locations of the plurality of feeding lines 1440 illustrated in FIG. 14.

It is indicated that the transmission coefficient between two radiators among the plurality of patch-type radiators 1430 and the plurality of straight radiators 1450 is not greater than −15 dB at 28 GHz which is the target frequency. Accordingly, it may be verified that antennas included in the patch antenna array and the dipole antenna array are electrically and sufficiently isolated from each other at 28 GHz even though the locations of the plurality of feeding lines 1440 are changed.

Figure 16A:
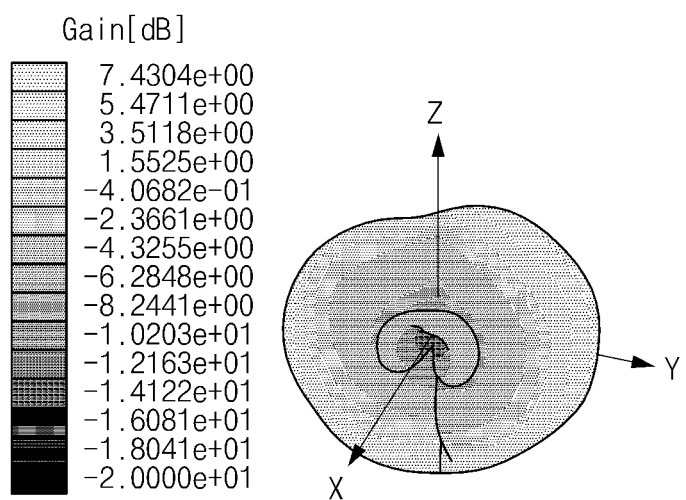
FIGS. 16A and 16B are graphs illustrating a gain according to a direction of an antenna device included in an electronic device, according to an embodiment.
Figure 16B:
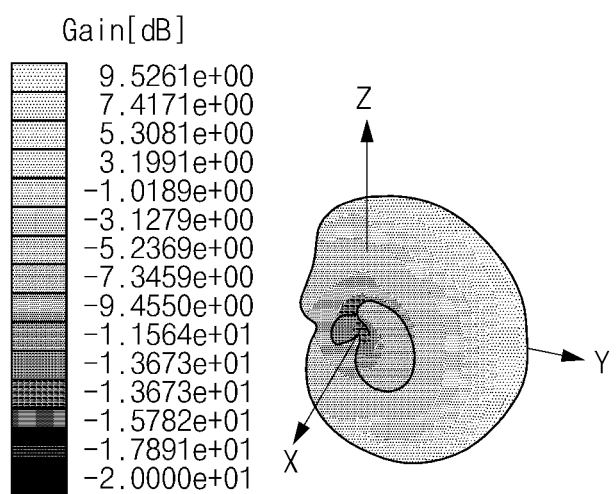

FIGS. 16A and 16B are graphs illustrating a gain according to a direction of an antenna device included in an electronic device, according to an embodiment.

FIG. 16A illustrates the gain according to the direction of a patch antenna array including the plurality of patch-type radiators 1430 shown in FIG. 14.

Referring to FIG. 16A, the gain of the patch antenna array may be a maximum in the Y-axis direction. The maximum value of the gain of the patch antenna array may be approximately 7.4 dB. As such, it is verified that the gain of the patch antenna array is improved in the case where the plurality of feeding lines 1440 illustrated in FIG. 14 are changed.

FIG. 16B illustrates the gain according to the direction of a dipole antenna array including the plurality of straight radiators 1450 shown in FIG. 14.

Referring to FIG. 16B, the gain of the dipole antenna array may be a maximum in the Y-axis direction. The maximum value of the gain of the dipole antenna array may be approximately 9.5 dB.

Figure 17:
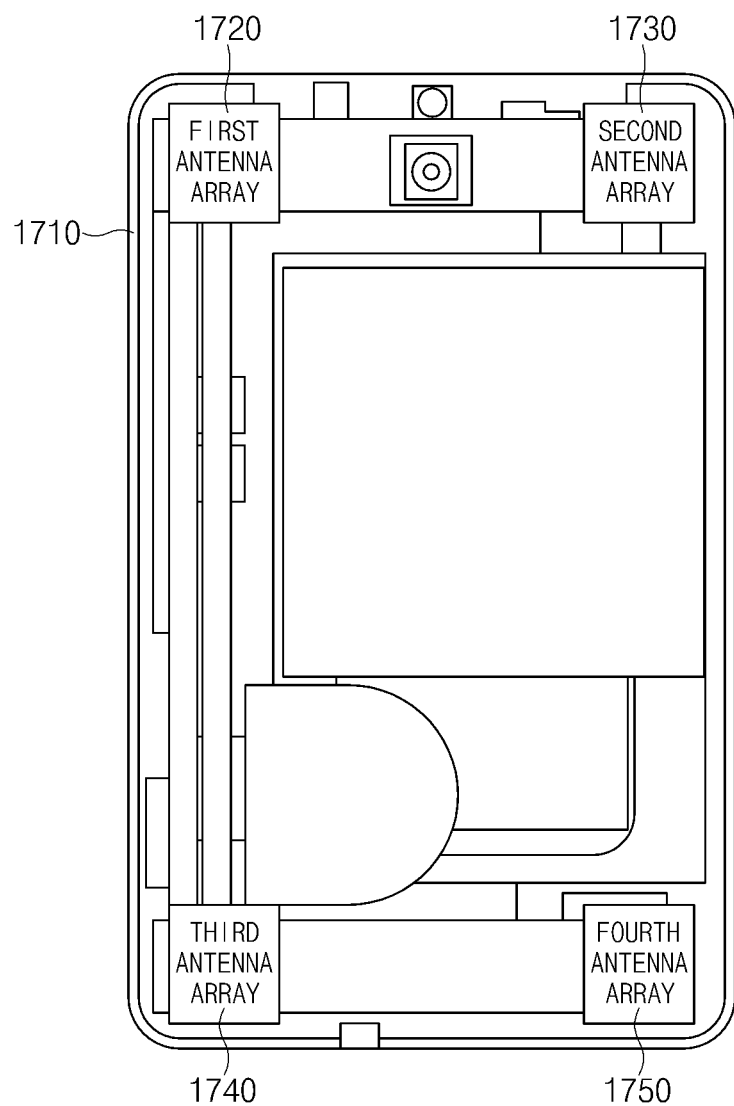
FIG. 17 illustrates an internal structure of an electronic device, according to an embodiment.

FIG. 17 illustrates an internal structure of an electronic device 1700, according to an embodiment.

Referring to FIG. 17, the electronic device 1700 may include a housing 1710, a first antenna array 1720, a second antenna array 1730, a third antenna array 1740, and a fourth antenna array 1750. For example, the electronic device 1700 may be a mobile terminal.

The housing 1710 may protect the other elements of the electronic device 1700. For example, the housing 1710 may include a front plate, a back plate facing away from the front plate, and a side member (or metal frame), which is attached to the back plate or is integrally formed with the back plate and which surrounds a space between the front plate and the back plate.

According to an embodiment, the first antenna array 1720, the second antenna array 1730, the third antenna array 1740, and the fourth antenna array 1750 may be positioned inside the housing 1710. The first antenna array 1720, the second antenna array 1730, the third antenna array 1740, and the fourth antenna array 1750 may include the antenna device 200 illustrated in FIG. 2. The first antenna array 1720 may be disposed on the upper left of the electronic device 1700. The second antenna array 1730 may be disposed on the upper right of the electronic device 1700. The third antenna array 1740 may be disposed on the lower left of the electronic device 1700. The fourth antenna array 1750 may be disposed on the lower right of the electronic device 1700.

The electronic device 1700 may further include a communication circuit (e.g., the communication module 190 of FIG. 1) electrically connected to the first antenna array 1720, the second antenna array 1730, the third antenna array 1740, and the fourth antenna array 1750 through feeding lines.

Figure 18:
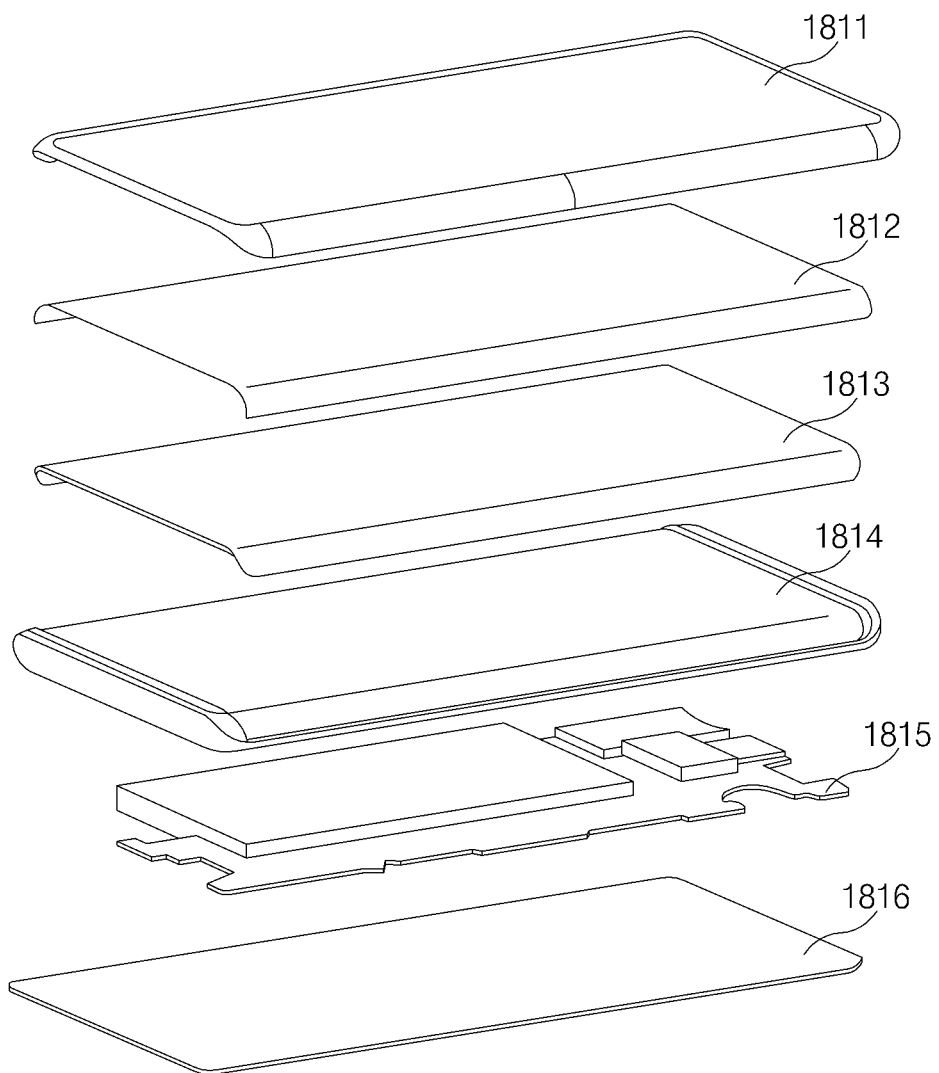
FIG. 18 is an exploded perspective view of an electronic device, according to an embodiment.

FIG. 18 is an exploded perspective view of an electronic device 1800, according to an embodiment.

Referring to FIG. 18, the electronic device 1800 may include a window 1811, an adhesive layer 1812, a display 1813, a support member 1814, a hardware configuration 1815, or a back plate 1816.

According to an embodiment, the window 1811 may be, for example, an outer protective layer that protects the outside of the display 1813. The window 1811 may be formed of a transparent material, such as a glass material, a polymer material, or the like. The window 1811 may be a front plate.

According to an embodiment, the adhesive layer 1812 may adhere to the window 1811 and the display 1813. The adhesive layer 1812 may be formed of an optically clear adhesive.

According to an embodiment, at least part of areas of the display 1813 may be formed to be transparent. The display 1813 may be exposed through at least part of the front plate of the electronic device 1800. The display 1813 may include at least one pixel.

According to an embodiment, the electronic device 1800 may include a side member provided to surround the side surfaces of the display 1813. The support member 1814 (e.g., a bracket) that fixes the hardware configuration 1815 such as a printed circuit board, a battery, or the like may be positioned between the display 1813 and the back plate 1816. The support member 1814 may be formed of, for example, a metal material (e.g., magnesium or the like) or a plastic material. The support member 1814 may be a part of the side member, may be integrated with the side member, or may include the side member.

According to an embodiment, a housing may include the support member 1814 and the back plate 1816. The back plate 1816 may be a plastic injection material, glass, or a metal material. For a design effect, the electronic device 1800 may further include a glass layer surrounding the back plate 1816. The side member may be integrally formed with or separate from the support member 1814. The side member may be separate from the support member 1814 but may be in a coupled state.

According to an embodiment, the hardware configuration 1815 may be interposed between the back plate 1816 and the support member 1814. The hardware configuration 1815 may include a printed circuit board, an AP, a CP, a battery, a PMIC, a speaker, a motor, a sensor, a connector, or the like.

According to an embodiment, an electronic device may include a housing including a front plate, a back plate facing away from the front plate, and a side member surrounding a space between the front plate and the back plate, a touchscreen display exposed through the front plate, an antenna array positioned inside the space, and including at least one group of a first conductive plate oriented parallel to the back plate and spaced diagonally from the back plate by a first distance, a pair of conductive elements spaced diagonally from the first conductive plate when viewed from above the back plate, oriented parallel to the back plate, and including a first conductive element spaced diagonally from the back plate by a second distance greater than the first distance and a second conductive element spaced diagonally from the back plate by a third distance greater than the second distance and a second conductive plate interposed diagonally between the first conductive plate and the pair of conductive elements when viewed from above the back plate and spaced diagonally from the back plate by a fourth distance greater than the first distance and smaller than the second distance, a wireless communication circuit electrically connected to the first conductive element and the first conductive plate and a processor electrically connected to the touchscreen display and the wireless communication circuit. The communication circuit may be configured to transmit and/or receive a signal in a range between 20 GHz and 40 GHz.

According to an embodiment, the antenna array may include a plurality of groups of the first conductive plate, the pair of conductive elements, and the second conductive plate, aligned along the side member when viewed from above the back plate.

According to an embodiment, the second conductive element may be electrically connected to ground.

According to an embodiment, the pair of the conductive elements may serve as a dipole antenna.

According to an embodiment, the first conductive plate may have a first size, the second conductive plate may have a second size smaller than the first size, and the first conductive element may have a third size smaller than the second size.

According to an embodiment, an antenna device may include a ground member including a plane part and a plurality of extension parts extending from one end of the plane part in a first direction and arranged along a second direction, a plurality of patch-type radiators arranged on the plane part along the second direction and radiating vertical polarization, and a plurality of straight radiators spaced apart from the ground member, respectively arranged to be adjacent to the plurality of extension parts, extending in the first direction, and radiating horizontal polarization.

According to an embodiment, each of the plurality of patch-type radiators may include a first part disposed in parallel with the plane part and a second part extending from one end of the first part toward the plane part.

According to an embodiment, each of the plurality of straight radiators may include a first part extending in the first direction and a second part extending from an end of the first part in a third direction opposite to the second direction.

According to an embodiment, each of the plurality of extension parts may include a first part extending in the first direction and a second part extending from an end of the first part in the second direction.

According to an embodiment, one or more slits may be are formed in the plane part, and the one or more slits may be respectively positioned in gaps between the plurality of extension parts.

According to an embodiment, the one or more slits may electrically isolate the plurality of patch-type radiators from each other.

According to an embodiment, the antenna device may further include a plurality of conductive members respectively disposed on the plurality of extension parts.

According to an embodiment, each of the plurality of conductive members may have a square shape.

According to an embodiment, the plurality of conductive members may be disposed to direct the vertical polarization and to reflect the horizontal polarization.

According to an embodiment, the antenna device may further include a plurality of feeding lines electrically and respectively connected to points of the plurality of patch-type radiators.

According to an embodiment, each of the plurality of patch-type radiators may include a first part disposed in parallel with the plane part and a second part extending from one end of the first part toward the plane part. The antenna device may further include a plurality of feeding lines electrically connected to points of the first parts of the plurality of patch-type radiators and extending through a slot formed in the second part, respectively.

According to an embodiment, the antenna device may further include a substrate configured to support the ground member, the plurality of patch-type radiators, and the plurality of straight radiators.

According to an embodiment, an antenna device may include a broad-side antenna array and an end-fire antenna array disposed adjacent to one end of the broad-side antenna array. The end-fire antenna array includes a ground member including a plane part and a plurality of extension parts extending from one end of the plane part in a first direction being a direction away from the broad-side antenna array and arranged along a second direction perpendicular to the first direction, a plurality of patch-type radiators arranged on the plane part along the second direction and radiating vertical polarization, and a plurality of straight radiators spaced apart from the ground member, respectively arranged to be adjacent to the plurality of extension parts, extending in the first direction, and radiating horizontal polarization.

According to an embodiment, the end-fire antenna array may be disposed adjacent to one end of the broad-side antenna array and another end adjacent to the one end.

According to an embodiment, the end-fire antenna array may further include a plurality of conductive members respectively disposed on the plurality of extension parts.

Various embodiments of the present disclosure and terms used herein are not intended to limit the present disclosure to certain embodiments, and it should be understood that the embodiments may include a modification, an equivalent, and/or an alternative of the corresponding embodiments described herein. With regard to the description of accompanying drawings, similar elements may be marked by similar reference numerals. The terms of a singular form may include plural forms unless otherwise specified. In the present disclosure, the expressions "A or B", "at least one of A and/or B", "at least one of A and/or B", "A, B, or C", and "at least one of A, B, and/or C", and the like may include any and all combinations of one or more of the associated listed items. Expressions such as "first," "second," and the like may express their elements regardless of their priority or importance and may be used to distinguish one element from another element but is not limited to these components. When an (e.g., a first) element is referred to as being "(operatively or communicatively) coupled with/to" or "connected to" another (e.g., a second) element, it may be directly coupled with/to or connected to the other element or an intervening element (e.g., a third element) may be present.

According to the situation, the expression "adapted to or configured to" used herein may be used interchangeably with, for example, the expression "suitable for", "having the capacity to", "changed to", "made to", "capable of" or "designed to". The expression "a device configured to" may indicate that the device is capable of operating with another device or other components. For example, a "processor configured to (or set to) perform A, B, and C" may indicate a dedicated processor (e.g., an embedded processor) for performing corresponding operations or a general purpose processor (e.g., a CPU or an AP) which performs corresponding operations by executing one or more software programs which are stored in a memory device (e.g., the memory 130).

The term "module" used in the present disclosure may include a unit implemented with hardware, software, or firmware. For example, the term "module" may be used interchangeably with the terms "logic", "logic block", "component", "circuit", and the like. The term "module" may indicate a minimum unit of an integrated component or a part thereof or may indicate a minimum unit for performing one or more functions or a part thereof. The term "module" may indicate a device implemented mechanically or electronically and may include, for example, an application-specific integrated circuit (ASIC), a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a non-transitory computer-readable storage medium (e.g., the memory 130) in the form of a program module. The instruction, when executed by a processor (e.g., a processor 120), may cause the processor to perform a function corresponding to the instruction. The non-transitory computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), an embedded memory, and the like. The one or more instructions may contain code generated by a compiler or code executable by an interpreter.

Each element (e.g., a module or a program module) according to various embodiments may be composed of a single entity or a plurality of entities, where a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a housing including a front plate, a back plate facing away from the front plate, and a side member surrounding a space between the front plate and the back plate;
a touchscreen display exposed through the front plate;
an antenna array positioned inside the space, and including at least one group of:
a first conductive plate oriented parallel to the back plate and spaced from the back plate by a first distance;
a pair of conductive elements spaced from the first conductive plate when viewed from above the back plate, oriented parallel to the back plate, and including:
a first conductive element spaced from the back plate by a second distance greater than the first distance; and
a second conductive element spaced from the back plate by a third distance greater than the second distance, and
a second conductive plate interposed between the first conductive plate and the pair of conductive elements when viewed from above the back plate and spaced from the back plate by a fourth distance greater than the first distance and less than the second distance;
a wireless communication circuit electrically connected to the first conductive element and the first conductive plate, wherein the communication circuit is configured to transmit and/or receive a signal in a range between 20 GHz and 40 GHz; and
a processor electrically connected to the touchscreen display and the wireless communication circuit.

2. The electronic device of claim 1, wherein the antenna array includes a plurality of groups of the first conductive plate, the pair of conductive elements, and the second conductive plate, aligned along the side member when viewed from above the back plate.

3. The electronic device of claim 1, wherein the second conductive element is electrically connected to ground.

4. The electronic device of claim 3, wherein the pair of the conductive elements are configured as a dipole antenna.

5. The electronic device of claim 1, wherein the first conductive plate has a first size, the second conductive plate has a second size less than the first size, and the first conductive element has a third size less than the second size.

6. An antenna device, comprising:
a ground member including a plane part and a plurality of extension parts extending from one end of the plane part in a first direction and arranged along a second direction;
a plurality of patch-type radiators arranged on the plane part along the second direction and configured to radiate vertical polarization; and
a plurality of straight radiators spaced apart from the ground member, respectively arranged to be adjacent to the plurality of extension parts, extending in the first direction, and configured to radiate horizontal polarization,
wherein one or more slits are formed in the plane part.

7. The antenna device of claim 6, wherein each of the plurality of patch-type radiators includes a first part disposed in parallel with the plane part and a second part extending from one end of the first part toward the plane part.

8. The antenna device of claim 6, wherein each of the plurality of straight radiators includes a first part extending in the first direction and a second part extending from an end of the first part in a third direction opposite to the second direction.

9. The antenna device of claim 6, wherein each of the plurality of extension parts includes a first part extending in the first direction and a second part extending from an end of the first part in the second direction.

10. The antenna device of claim 6, wherein the one or more slits are positioned in gaps between the plurality of extension parts, respectively.

11. The antenna device of claim 6, wherein the one or more slits are configured to electrically isolate the plurality of patch-type radiators from each other.

12. The antenna device of claim 6, further comprising:
a plurality of conductive members disposed on the plurality of extension parts, respectively.

13. The antenna device of claim 12, wherein each of the plurality of conductive members has a square shape.

14. The antenna device of claim 12, wherein the plurality of conductive members are disposed to direct the vertical polarization and to reflect the horizontal polarization.

15. The antenna device of claim 6, further comprising:
a plurality of feeding lines electrically connected to points of the plurality of patch-type radiators, respectively.

16. The antenna device of claim 6, wherein each of the plurality of patch-type radiators includes a first part disposed in parallel with the plane part and a second part extending from one end of the first part toward the plane part, and
the antenna device further comprising:
a plurality of feeding lines electrically connected to points of the first parts of the plurality of patch-type radiators and extending through a slot formed in the second part, respectively.

17. The antenna device of claim 6, further comprising:
a substrate configured to support the ground member, the plurality of patch-type radiators, and the plurality of straight radiators.

18. An antenna device, comprising:
a broad-side antenna array; and
an end-fire antenna array disposed adjacent to one end of the broad-side antenna array,
wherein the end-fire antenna array includes:
a ground member including a plane part and a plurality of extension parts extending from one end of the plane part in a first direction being a direction away from the broad-side antenna array and arranged along a second direction perpendicular to the first direction;
a plurality of patch-type radiators arranged on the plane part along the second direction and configured to radiate vertical polarization; and
a plurality of straight radiators spaced apart from the ground member, respectively arranged to be adjacent to the plurality of extension parts, extending in the first direction, and configured to radiate horizontal polarization.

19. The antenna device of claim 18, wherein the end-fire antenna array is disposed adjacent to one end of the broad-side antenna array and another end adjacent to the one end.

20. The antenna device of claim 18, wherein the end-fire antenna array further includes:
a plurality of conductive members disposed on the plurality of extension parts, respectively.

21. An electronic device, comprising:
a housing; and
an antenna array positioned inside the housing, and including at least one group of:

a first conductive plate oriented parallel to a back plate of the housing and spaced from the back plate by a first distance;

a pair of conductive elements spaced from a first conductive plate and oriented parallel to the back plate, and including:
   a first conductive element spaced from the back plate by a second distance greater than the first distance, and
   a second conductive element spaced from the back plate by a third distance greater than the second distance; and a second conductive plate interposed between the first conductive plate and the pair of conductive elements, and spaced from the back plate by a fourth distance greater than the first distance and less than the second distance.

\* \* \* \* \*